United States Patent [19]

Mills, Jr.

[11] 3,995,656
[45] Dec. 7, 1976

[54] HIGH PRESSURE GAS REGULATOR
[75] Inventor: Justin W. Mills, Jr., Cinnaminson, N.J.
[73] Assignee: Lif-O-Gen, Inc., Cambridge, Md.
[22] Filed: Feb. 15, 1972
[21] Appl. No.: 226,603
[52] U.S. Cl. .......................... 137/497; 137/505.25
[51] Int. Cl.² ...................................... F16K 31/12
[58] Field of Search ............ 137/505.25, 497, 63, 137/498, 505.12; 251/121, 120; 138/45; 239/31, 32

[56] References Cited
UNITED STATES PATENTS

| 2,572,244 | 10/1951 | Chace | 138/45 X |
| 2,873,083 | 2/1959 | Rimsha | 251/121 |
| 3,004,686 | 10/1961 | McKee | 137/505.25 X |
| 3,121,445 | 2/1964 | Wisniewski | 138/45 |
| 3,166,500 | 1/1965 | Noakes | 138/45 X |
| 3,511,266 | 5/1970 | Philpot | 137/505.25 X |

FOREIGN PATENTS OR APPLICATIONS

| 48,208 | 1/1914 | Sweden | 137/505.12 |

Primary Examiner—Harold W. Weakley
Attorney, Agent, or Firm—Howson and Howson

[57] ABSTRACT

A regulator for the control of high pressure gases comprises a first piston type regulator stage and a one piece resilient flow control washer which serves as a second regulating stage. The flow washer comprises a resilient element having an orifice therein through which the regulated gas passes. The washer is shaped and mounted so that gas pressure variations deform the washer and vary the size of the orifice to maintain a constant gas flow rate therethrough.

6 Claims, 4 Drawing Figures

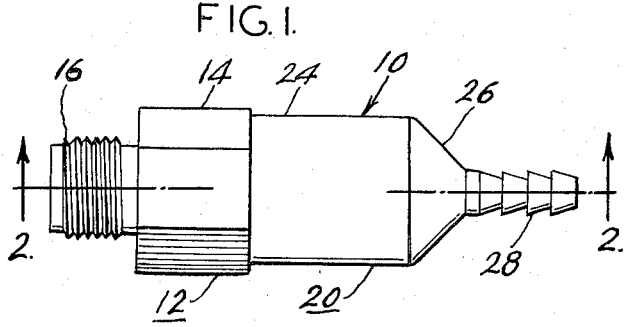
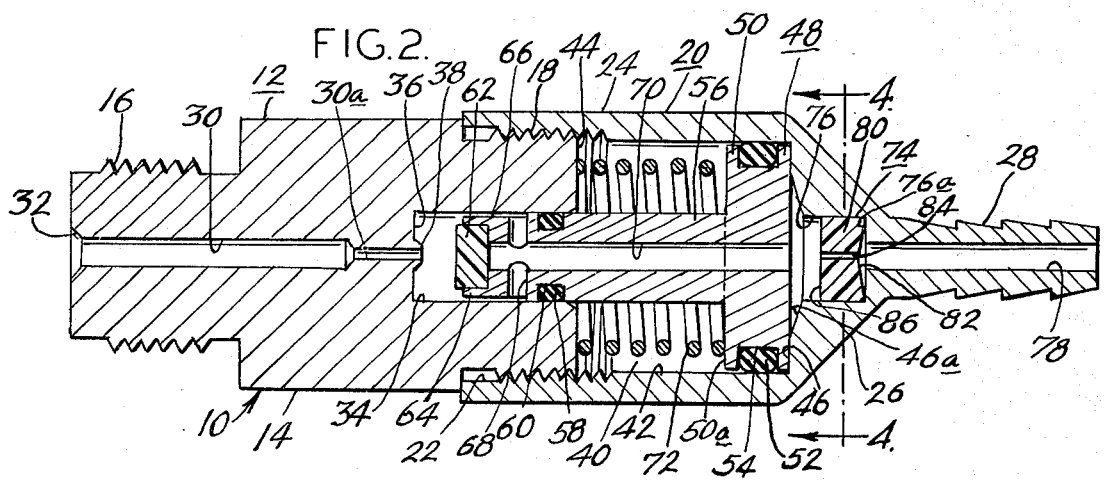
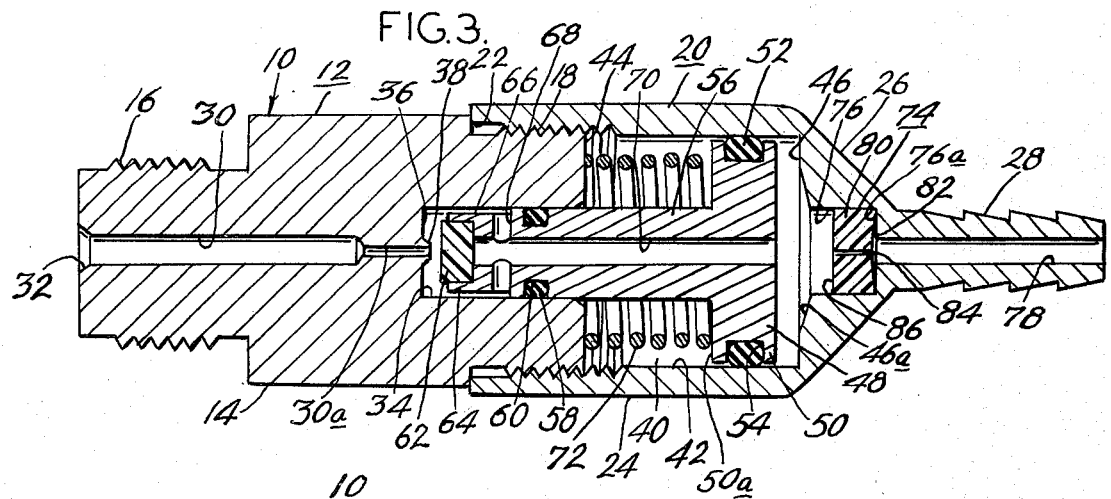
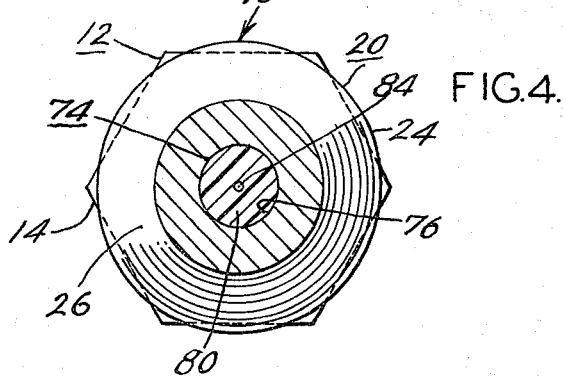

HIGH PRESSURE GAS REGULATOR

The present invention relates generally to pressure regulating devices for high pressure gases and relates more particularly to a regulator employing a spring biased differential piston as a first regulating stage and a variable orifice flow control washer as the second stage.

The delivery of high pressure gases at a predetermined flow rate from a source subject to pressure fluctuations requires the use of some type of regulator. In the dispensing of gas from a high pressure cylinder, for example, the gas pressure may vary from several thousand pounds to nearly zero, and the regulating device must be adapted to accurately control the gas flow at any pressure throughout this range.

A single stage regulator cannot accurately govern gas flow from a pressure source when the pressure input varies widely as in the case of an emptying tank. Single stage regulators are typically either of the type wherein the regulator seat closes against the gas pressure, or the seat closes with the pressure. In the first case, the regulator delivery pressure decreases as the inlet pressure decreases. This decrease can be in the range of 300–500%. In the second case wherein the seat closes with the inlet pressure, the delivery pressure may increase as much as 200%. Since the outlet of a regulator is a fixed orifice, any variation in delivery pressure results in a corresponding change in the flow of gas through the regulator.

Due to the inability of single stage regulators to deliver a constant gas flow under conditions of widely varying input pressures, it is necessary under such conditions to employ a complex two-stage control to reduce the gas pressure to a point close to the desired delivery pressure. A second stage regulator is then employed for the final pressure reduction. Such control systems are complex and expensive, but, prior to the present invention, were necessary to provide a steady gas flow from a variable pressure source.

In the present regulator, a substantially conventional differential piston type regulating means is used in conjunction with a variable orifice flow control washer to achieve a substantially constant gas flow but without the complexity and expense of the conventional two-stage regulator system. In the present invention, the differential pressure piston serves as a first stage regulator to reduce the input pressure to within the control range of the variable orifice flow control washer. The deformation of the washer by the gas pressure between the piston and the washer varies the size of the washer orifice. An increase in the pressure in this region deforms the washer to decrease the size of the orifice, and conversely a decrease in pressure results in an increased orifice size. The washer thus functions automatically to provide a uniform flow of gas.

It is accordingly a first object of the present invention to provide a novel gas regulator for regulating the delivery of high pressure gases.

An additional object of the invention is to provide a regulator as described of a relatively simple, inexpensive construction.

Still another object of the invention is to provide a regulator as described, the delivery characteristics of which may be readily varied in the field without the use of special tools.

Another object of the invention is to provide a regulator as described having a variable orifice device as a second regulating stage.

A still further object of the invention is to provide a regulator as described wherein the variable orifice device is an inexpensive element which may be readily replaced in the field.

Additional objects and advantages of the invention will be more readily apparent from the following detailed description of an embodiment thereof when taken together with the accompanying drawings wherein:

FIG. 1 is a plan view of a regulator embodying the present invention;

FIG. 2 is a vertical sectional view taken along line 2—2 of FIG. 1 and showing the interior details of the regulator with the regulator in an unpressurized condition;

FIG. 3 is a view similar to FIG. 2 but showing the regulator in a pressurized condition carrying out its regulating function; and FIG. 4 is a sectional view taken along line 4—4 of FIG. 2.

Referring to the drawings, the regulator 10 embodying the present invention comprises a regulator body 12 having a hexagonal outer surface 14 and terminating at opposite ends in cylindrical threaded portions 16 and 18. A hollow bonnet 20 is interiorly threaded adjacent its open end at 22 and adapted for threaded attachment to the threaded portion 18 of the body 12. The bonnet 20 is characterized by a cylindrical outer surface 24 intersecting at its closed end a conical surface 26 which terminates in a coaxially extending stepped hose bar 28.

Considering the interior details of the body and bonnet, the body 12 includes a coaxial gas inlet passage 30 which necks down into a narrower passage 30a. The passage 30 at its outer end 32 opens outwardly of the body which by means of the threaded neck portion 16 is adapted for connection to a source of high pressure gas to be regulated.

A coaxial bore 34 extends into the inner end of the body and meets the passage 30a through which high pressure gas passes into the bore 34. The inner end 36 of the bore 34 includes a conical valve seat 38 at the intersection of the passage portion 30a and the bore 34.

A piston chamber 40 within the bonnet 24 is defined by the cylindrical inner wall 42 of the hollow bonnet, the inner end wall 44 of the body, and the end wall 46 of the bonnet bore. A pressure regulating piston assembly 48 comprises a piston 50 slidably disposed within the piston chamber 40 and having an O-ring 52 disposed within an annular slot 54 thereof to seal the piston in sliding engagement with the cylindrical wall 42 of the chamber. An integral rod portion 56 of the piston extends coaxially from the piston toward and into the bore 34 of the body 12. An O-ring seal 58 disposed in slot 60 of the rod portion 56 of the piston seals the rod portion for sliding movement with respect to the bore 34. Even with the piston 50 against the end wall 46 of the bonnet bore, the O-ring seal 58 of the rod portion remains within the bore 34 as shown in FIG. 2.

A resilient valve element 62 is inserted in a suitable bore in the end 64 of the rod portion 56 of the piston and is adapted to cooperate with the valve seat 38 of the body to govern the gas flow from the passage 30a into the bore 34. The rod portion 56 is of a reduced diameter along the region 66 from the end 64 to a transverse bore 68 which intersects a coaxial bore 70 extending through the entire length of the piston including the rod portion. Gas flow into the bore 34 from the passage 30a of the body may thus pass along the region 66 of the piston rod portion, through bore 68 into bore 70 and into the chamber 40 at the right hand side of the piston. A coil spring 72 in the chamber 40 is seated in compression at one end thereof against the end 44 of the body 12, and at the other end against the face 50a of the piston and serves to bias the piston to the right, thus urging the valve element 62 away from the valve seat 38.

The piston assembly 48 serves as a single stage pressure regulator and functions in a substantially conventional manner to regulate the flow of gas from the passage 30 through the regulator. This device, however, is subject to the shortcomings described above with respect to single stage regulators of the type wherein the regulator seat closes against the pressure, in that the regulator decreases in delivery pressure as the inlet pressure decreases. To compensate for this undesirable characteristic, a variable orifice flow control means generally designated 74 is provided. The flow control means 74 comprises a coaxial bore 76 in the bonnet end wall 46 which as illustrated intersects a conical surface 46a of the end wall. The bore 76 is characterized by a perpendicular end wall 76a through which opens the smaller diameter coaxial gas discharge passage 78 of the hose bar portion 28 of the bonnet.

Seated within the bore 76 is the flow control washer 80 which is a cylindrical resilient element having an outer diameter essentially the same as that of the bore 76 and which has a concave face 82 juxtaposed the end 76a of the bore 76. A coaxial small diameter flow control passage 84 in the flow control washer extends from the flat inner face 86 of the washer to the concave face 82 thereof and permits a gas flow from the chamber 40 into the discharge passage 78.

The flow control washer 80 is formed of a resilient readily deformable material so that the washer changes shape in response to changes of pressure in the chamber 40 and in doing so varies the size of the gas passage 84. With an increase in pressure in the chamber 40, the washer 80 will be deformed so as to flatten the concave face 82 against the flat end 76a of the bore 76 which will tend to diminish the size of the passage 84. Upon a decrease in pressure in the chamber 40, the flow control washer will resiliently expand away from the end 76a of the bore, thus enlarging the size of the passage 84. As a result of the washer deformation, a constant flow of gas is maintained through the flow control washer regardless of the pressure variation within the chamber 40, at least within the range of variation provided by the single stage regulating device embodied in the piston assembly 40.

For operation of the regulator, the threaded neck 16 of the body 12 is connected in a conventional manner with a source of high pressure gas such as a pressurized tank so that the pressurized gas passes into the passages 30 and 30a into the bore 34. The hose bar 78 is inserted in a flexible hose (not shown) adapted to deliver the regulated gas flow as desired. In the absence of pressurized gas, as shown in FIG. 2 the piston 50 will under the influence of spring 72 move to the right in the chamber 40 against the end wall 46 of the bonnet bore.

In FIG. 3, the regulator is illustrated as it would appear when pressurized gas is applied to the passage 30 and passes through the passage portion 30a into the bore 34. The gas passes around the reduced portion 66 of the piston rod portion, through bores 68 and 70 of the piston and into the chamber 40 at the right hand end of the piston. The substantially larger area of the piston right hand end as contrasted with the area of the piston rod presented in the bore 34 produces a pressure differential force serving to move the piston to the left against the force of spring 72. The piston will move to a position wherein the force of the spring plus the pressurized gas in bore 34 acting on the piston rod end equals the force produced by the gas pressure in the chamber 40 to the right of the piston. A higher input pressure of gas into the passage 30 will serve to compress the spring 72 further, thus throttling the flow at the valve seat 62 and serving to hold the flow through the piston to a substantially uniform rate. The construction and operation of the piston as a pressure regulator is substantially conventional as herebefore indicated.

With the flow rate of the high pressure gas made substantially uniform by the piston type regulator, the gas pressure against the face 86 of the flow control washer will vary only over a predictable relatively narrow range which might for example be between zero and 100 psi even with an input pressure at passage 30 ranging between zero and several thousand pounds. The range of control of the flow control washer 80 is, due to its resilient nature, rather limited in comparison with that of the piston type regulator, and accordingly could not alone serve to regulate high pressure gases.

As indicated above, the flow control washer when subjected to pressurized gas in the chamber 40 will deform much in the manner shown in FIG. 3 whereby the concave face 82 is compressed toward the flat end 76a of the bore 76, thereby deforming the washer and varying the size of the passage 84. The compression of the washer toward the bore end upon increased pressure in the chamber will tend to close the passage 84, while the release of the washer upon decreased pressure in the chamber 40 will provide an enlargement of the passage. Since the rate of flow of gas through a passage varies with the pressure of the gas and the size of the orifice, the concurrent inverse change of the passage size with the chamber pressure will result in a constant flow rate of gas through the flow control washer over a predetermined operating range.

It will be apparent that for a given rate of flow or output pressure desired, the rate of the spring 72 as well as the range and characteristics of the flow control washer must be selected. In this respect, the size, thickness, material, resilience, shape, and passage size of the flow control washer are factors which will influence the output of the regulator. The regulator may of course be readily disassembled in the field to permit a change of the spring 72 as well as the flow control washer 84, each of which are inexpensive items which may be replaced without special tools. By changing the spring and flow washer, the regulator flow rate may be readily varied as desired.

The flow control washer is not itself a novel concept, a similar flow control device having previously been known for regulating the flow of liquids. In particular, this type of flow control washer has been used for maintaining a constant input into appliances such as dishwashing machines wherein the water input is gauged on a time basis rather than by float type controls. The use of such a flow control device has been limited to situations of a rather narrow pressure variation.

A preferred material for the flow control washer is a synthetic rubber such as Viton (E. I. DuPont de Nemours, Wilmington, Del.). The washer must be readily deformable and a 70 durometer density has proved suitable in embodiments of the invention which have been successfully tested. The shape of the flow control washer may be widely varied without impairing the function of the washer. For example, the concave face illustrated could alternatively be a flat perpendicular face with the face 76a of the bore being concave to produce an equivalent flow control deformation of the washer. Similarly, the washer may have more than one gas flow passage, each of which would vary with the deformation of the washer.

As a specific example of a successfully tested regulator in accordance with the invention, with a high pressure gas input (oxygen) ranging between 0 and 2000 psi, the first stage piston regulator was provided with a spring 72 which reduced the pressure at the right hand end of the piston in the chamber 40 to the range of 15–70 psi. A flow control washer made of 70 durometer Viton was employed having a diameter of 0.260 inch and a central passage having a diameter of 0.030 inch. The concave face 82 was shaped substantially as illustrated in FIG. 2 and the flow control washer served to produce a substantially constant rate of flow of gas between 6 and 6½ liters per minute.

Although the described embodiment has included a piston-type regulator for the first regulating stage, a diaphragm type regulator could also be employed as the first regulating stage and would cooperate with the resilient flow control washer to provide a uniform gas flow in the same manner as described above.

Manifestly, changes in details can be effected by those skilled in the art without departing from the spirit and the scope of the invention.

I claim:

1. A pressure regulator for regulating the flow of high pressure gases comprising a housing, first and second regulator stages within said housing, passage means in said housing for connecting said first regulator stage with a high pressure gas source, said first regulator stage automatically reducing the pressure of said high pressure gas to a predetermined pressure range, passage means in said housing for directing the pressure regulated gas from said first regulator stage into said second regulator stage, said second regulator stage automatically regulating the gas flow from said first regulator stage to a constant predetermined level, passage means in said housing for discharging the regulated gas flow from said second regulator stage, said second regulator stage comprising a resilient flow control element having a gas passage therethrough, said flow control element being mounted in said housing so as to deform under the influence of pressurized gas flowing from said first regulator stage, the deformation of said flow control element in response to variations in the gas pressure acting thereon within said predetermined range producing a commensurate variation in size of said gas passage therein to provide a regulation of the gas flow therethrough.

2. The invention claimed in claim 1 wherein said flow control element comprises a cylindrical flow control washer having a coaxial gas passage therein.

3. The invention as claimed in claim 2 wherein the end face of said flow control washer at the downstream end thereof has a concave shape.

4. The invention as claimed in claim 1 wherein said primary regulating means comprises a piston-type regulator.

5. A regulator for regulating the flow of high pressure gases comprising a housing, first and second regulator stages within said housing, said first regulator stage comprising a chamber within said housing, a piston assembly slidably disposed within said chamber and having seal means slidably engaging the wall of said chamber, a high pressure gas inlet passage in said housing, a valve element on said piston adapted to throttle the flow of gas through said passage in accordance with the position of said piston, passage means in said piston for providing a passage of gas from said passage through said piston into said chamber on the opposite side thereof from said valve element, spring means resiliently biasing said piston to move said piston seat away from said body, said first regulator stage automatically reducing the pressure of said high pressure gas to a predetermined pressure range, a second regulator stage mounted in said housing in communication with said chamber, said second regulator stage comprising a cylindrical resilient flow washer having a small coaxial gas passage therein, a gas discharge passage in said housing communicating with said flow washer on the opposite side thereof from said chamber, said flow washer being adapted to deform under the influence of pressurized gas in said chamber, the deformation of said flow control washer in response to variations in gas pressure acting thereon within said predetermined range producing a commensurate variation of said gas passage therein to provide a regulation of the gas flow therethrough.

6. The invention as claimed in claim 5 wherein the end face of said flow control washer at the downstream end thereof has a concave shape.

* * * * *